US012437861B2

(12) United States Patent
Tan

(10) Patent No.: US 12,437,861 B2
(45) Date of Patent: Oct. 7, 2025

(54) SYSTEM AND METHOD FOR ENHANCING PLASMA ACQUISITION AT A PLASMA DONATION CENTER

(71) Applicant: Haemonetics Corporation, Boston, MA (US)

(72) Inventor: Melvin Tan, Edmonton (CA)

(73) Assignee: Haemonetics Corporation, Boston, MA (US)

( * ) Notice: Subject to any disclaimer, the term of this patent is extended or adjusted under 35 U.S.C. 154(b) by 667 days.

(21) Appl. No.: 17/271,510

(22) PCT Filed: Aug. 26, 2019

(86) PCT No.: PCT/US2019/048146
§ 371 (c)(1),
(2) Date: Feb. 25, 2021

(87) PCT Pub. No.: WO2020/046816
PCT Pub. Date: Mar. 5, 2020

(65) Prior Publication Data
US 2021/0366597 A1 Nov. 25, 2021

Related U.S. Application Data

(60) Provisional application No. 62/722,930, filed on Aug. 26, 2018.

(51) Int. Cl.
G16H 40/20 (2018.01)
A63F 13/79 (2014.01)
(Continued)

(52) U.S. Cl.
CPC ............ G16H 40/20 (2018.01); A63F 13/79 (2014.09); G06Q 30/0214 (2013.01);
(Continued)

(58) Field of Classification Search
CPC .... G16H 40/20; G16H 10/60; G06Q 30/0214; G06Q 30/0215; G06Q 30/0226; G06Q 50/01; A63F 13/79; H04L 67/12
(Continued)

(56) References Cited

U.S. PATENT DOCUMENTS

2011/0196725 A1 8/2011 Malcolmson et al.
2011/0212717 A1* 9/2011 Rhoads ................. G06V 10/24
455/418
(Continued)

FOREIGN PATENT DOCUMENTS

JP 2004-126643 A 4/2004
JP 2004-318764 A 11/2004
(Continued)

OTHER PUBLICATIONS

Evans, Dorcas E; Development of Intrinsic Motivation for Voluntary Blood Donation Among First-Time Donors; The University of Wisconsin—Madison. ProQuest Dissertations Publishing, 1981. 8125716. (Year: 1981).*
(Continued)

Primary Examiner — Hiep V Nguyen
(74) Attorney, Agent, or Firm — McCarter & English, LLP; Jonathan C. Lovely

(57) ABSTRACT

A method for engaging a donor includes receiving, in a server, donor information and donation data for the donor, and sending a first communication to the donor. The first communication may be sent to the donor after completion of a donation and the method may monitor a time period after the donation to determine when a predetermined period of time has passed. The method may then generate and send a second communication to the donor after the passage of the predetermined time period. The second communication may remind the donor of that the donor is eligible to donate again (Continued)

and may include a preferred date and time for the donor to return to donate again. The preferred date and time may be based, at least in part, on heuristic information about the donation center's productivity. The method may also generate/send an additional message requesting a referral from the donor.

33 Claims, 2 Drawing Sheets

(51) Int. Cl.
  *G06Q 30/0207* (2023.01)
  *G06Q 30/0214* (2023.01)
  *G06Q 30/0226* (2023.01)
  *G06Q 50/00* (2024.01)
  *G16H 10/60* (2018.01)
  *H04L 67/12* (2022.01)

(52) U.S. Cl.
  CPC ..... *G06Q 30/0215* (2013.01); *G06Q 30/0226* (2013.01); *G06Q 50/01* (2013.01); *G16H 10/60* (2018.01); *H04L 67/12* (2013.01)

(58) Field of Classification Search
  USPC .............................................. 705/3
  See application file for complete search history.

(56) References Cited

U.S. PATENT DOCUMENTS

| | | |
|---|---|---|
| 2012/0038651 A1 | 2/2012 | Case et al. |
| 2012/0095931 A1 | 4/2012 | Gurion et al. |
| 2013/0073377 A1 | 3/2013 | Heath |
| 2013/0260710 A1 | 10/2013 | H R |
| 2015/0186834 A1 | 7/2015 | Mickles et al. |
| 2016/0103968 A1* | 4/2016 | Case ................... G06Q 10/087 705/2 |
| 2016/0105305 A1* | 4/2016 | Pignataro ............ H04L 41/0894 709/223 |
| 2017/0132673 A1 | 5/2017 | Skoog et al. |

FOREIGN PATENT DOCUMENTS

| | | | |
|---|---|---|---|
| JP | 2016-533607 A | 10/2016 | |
| JP | 2018-025887 A | 2/2018 | |
| WO | WO-2015100049 A2 * | 7/2015 | ......... G06Q 10/0875 |

OTHER PUBLICATIONS

Baesler et al., Blood centre inventory analysis using discrete simulation. 2012 Winter Simulation Conference Abstract. Dec. 12, 2012, 3 pages.

Foth et al., Social and mobile interaction design to increase the loyalty rates of young blood donors. Urban Informatics Research Lab, School of Design. Queensland University of Technology, Brisbane, Australia. Jul. 2, 2013, 10 pages.

Osorio et al., Simulation-optimization model for production planning in the blood supply chain. Health Care Management Science. Dec. 2017;20(4):548-64.

International Search Report and Written Opinion for Application No. PCT/US2019/048146, dated Nov. 5, 2019, 13 pages.

* cited by examiner

SYSTEM AND METHOD FOR ENHANCING PLASMA ACQUISITION AT A PLASMA DONATION CENTER

PRIORITY

This patent application is a 35 U.S.C. § 371 national stage filing of International Application No. PCT/US2019/048146, filed on Aug. 26, 2019, which claims priority from U.S. Provisional Application No. 62/722,930, filed Aug. 26, 2018, entitled "Plasma Donor Engagement," and naming Melvin Tan as inventor. The disclosure of each of the foregoing applications is incorporated herein, in its entirety, by reference.

TECHNICAL FIELD

The present invention relates to plasma donor communications, and more particularly to systems and methods that engage with the plasma donor to entice the donor to donate.

BACKGROUND ART

Engagement is a set of methods that many companies use to build relationships with individuals by interacting with these individuals. The methods typically utilize multiple channels and techniques that encourage interaction, sharing of experiences, and communication. The goal of engagement is to provide a relationship experience with the company that will gain and retain loyal customers. Companies utilize one or more reasons to initiate a personalized and timely communication with customers with the expectation that the customer will respond and stay engaged with the company. Once engaged, the company may continuously communicate information that causes the customer to think, believe, react, or respond in a predetermined way that continues the engagement until the company's goal is achieved. In essence, these communication methods allow the company to influence a customer's behavior and increase the probability that the behavior can be altered for the company's short and long-term benefit.

SUMMARY OF THE EMBODIMENTS

In accordance with one embodiment of the present invention a method for engaging a donor includes sending a first and second communication to a donor. The first communication may be sent to the donor after completion of a donation. The second communication may be sent to the donor after the passage of a predetermined time period. The second communication may remind the donor that the donor is eligible to donate again, and may include a preferred date and time for the donor to return to donate again. The preferred date and time may be based, at least in part, on heuristic information about the donation center's productivity. The communications may be sent to the donor's cellular or mobile device. The heuristic information about the donation center's productivity may be determined from the donation center's donor management system.

In some embodiments, the first communication may include information regarding a payment to the donor, a possible return date for a second donation or request input from the donor regarding their plasma center visit. The input may include feedback on their donation experience, feedback on the staff, feedback on the center and equipment used, or feedback on anything else related to the visit or the process of making a visit. The second communication may include an appointment reservation for a second donation, information regarding expected compensation, information regarding compensation accrual and balance, information regarding potential level achievement and trophies to be acquired, and/or pre-donation information about the plasma donor. The pre-donation information may include the date and time of the planned visit for scheduling an appointment and information about the plasma donor for pre-processing by the plasma center. The method may also send a third communication to the donor that requests a referral of at least one additional donor from the donor. The referral may grant access to the donor's contact list on their cellular or mobile device or from an external database (e.g., a social media platform).

In accordance with other embodiments, the method may send a communication to a potential donor in the contact list that includes a personalized message. The personalized message may include the name of the referring donor, the location of the plasma donation center, preferred date and time to donate, educational information about plasma donation, benefits and rewards of plasma donation, and/or links to other such resources related to plasma donations. At least one of the communications may include game mechanics. For example, the game mechanics may include rewards such as cash or points, redemption of rewards, communication of achievement levels, issuing challenges, awarding badges or trophies, tracking of achievement progress, and/or comparing progress against a leaderboard of other plasma donors.

The method may also determine capacity and requirements for a donation center, calculate a number of donors required by the donation center to achieve a target productivity, and send, if there is a difference between an actual number of donors and a target number of donors, a communication to a database of plasma donors maintained by a donor management system. The communication may provide information to the plasma donor in order to entice the donor to return to the donation center. Additionally or alternatively, the communication may include gamification motivational techniques to increase the probability of donor engagement. Any of the communications may be sent via text messaging systems, notification systems, e-mails, ringer, vibrations or other related visual, audible or haptic systems provided by mobile devices. The method will also selectively identify donors from the database of plasma donors to ensure the highest likelihood that the donor will return for a visit at the date and time identified by the system.

In accordance with further embodiments a method for engaging a donor includes receiving, in a server, donor information and donation data for the donor, and sending a first communication to a donor. The first communication may be sent to the donor after completion of a donation (e.g., to the donor's cellular or mobile device). The method may also monitor a time period after the donation to determine when a predetermined period of time has passed and may generate a second communication to the donor after the passage of the predetermined time period. The second communication may remind the donor that the donor is eligible to donate again, and may include a preferred date and time for the donor to return to donate again. The preferred date and time may be based, at least in part, on heuristic information about the donation center's productivity. The method may then send the second communication to the donor.

In some embodiments, the first communication may include information regarding a payment to the donor and/or a possible return date for a second donation. The second communication may include an appointment reservation for a second donation, information regarding expected compensation, information regarding compensation accrual and balance, and/or information regarding potential level achievement and trophies to be acquired.

The method may also send a third communication to the donor that requests a referral of at least one additional donor from the donor. In such embodiments, the method may receive a referral from the donor in response to the third communication. The referral may grant access to the donor's contact list on their cellular or mobile device or from an external database (e.g., a social media platform). The method may then generate and send a referral communication to at least one potential donor from the contact list. The referral communication may include a personalized message. The personalized message may include the name of the referring donor, the location of the plasma donation center, preferred date and time to donate, educational information about plasma donation, benefits and rewards of plasma donation, and/or links to other such resources related to plasma donations.

In other embodiments, the first, second and/or referral communication may include game mechanics. The game mechanics may include reward cash, reward points, redemption of rewards, communication of achievement levels, issuing challenges, awarding badges or trophies, tracking of achievement progress, and/or comparing progress against a leaderboard of other plasma donors.

In further embodiments, the method may receive donation center data from a donation center. The donation center data may include productivity data for the donation center and the method may determine, based on the donation center data, capacity and requirements for the donation center. The method may then calculate, using a heuristics model, a number of donors required by the donation center to achieve a target productivity. If there is a difference between an actual number of donors and a target number of donors, the method may generate and send, an additional communication to a plurality of donors within a donor database. The donor database may include a list of plasma donors maintained by a donor management system. The additional communication may provide information to the plasma donor in order to entice the donor to return to the donation center and/or may include gamification motivational techniques to increase the probability of donor engagement.

The communications may be sent via text messaging systems, notification systems, e-mails, ringer, vibrations or other related visual, audible or haptic systems provided by mobile devices. The heuristic information about the donation center's productivity may be determined from the donation center's donor management system. The method may also store, in a data storage device, the donor information and donor data.

In accordance with additional embodiments, a system for engaging a donor includes a server, a processor, an heuristic module, and a message generator. The server may receive donor information and donation data for the donor from a donor database and receive productivity data from a donation center. The processor may monitor, based on the donor information and donation data, a time period after a donation to determine when a predetermined period of time has passed. The heuristic module may analyze the productivity data from the donation center and determine a preferred date and time for the donor to return to the donation center for an additional donation. The message generator may generate and send a first communication to the donor (e.g., to the donor's cellular or mobile device) after the donor has completed a donation and a second communication to the donor after the passage of the predetermined time period. The second communication may remind the donor that the donor is eligible to donate again and may include the preferred date and time for the donor to return.

The first communication may include information regarding a payment to the donor and/or a possible return date for a second donation. The second communication may also include an appointment reservation for a second donation, information regarding expected compensation, information regarding compensation accrual and balance, and/or information regarding potential level achievement and trophies to be acquired.

The message generator may also generate and send a third communication to the donor. The third communication may request a referral of at least one additional donor from the donor. In such embodiments, the server may receive the referral from the donor in response to the third communication. The referral may grant access to the donor's contact list. The message generator may generate and send a referral communication to at least one potential donor from the contact list. The referral communication may include a personalized message including the name of the referring donor, the location of the plasma donation center, preferred date and time to donate, educational information about plasma donation, benefits and rewards of plasma donation, and/or links to other such resources related to plasma donations.

The first, second and/or referral communications may include game mechanics. The game mechanics may include reward cash, reward points, redemption of rewards, communication of achievement levels, issuing challenges, awarding badges or trophies, tracking of achievement progress, and/or comparing progress against a leaderboard of other plasma donors.

In some embodiments, the heuristic module may determine, based on the donation center productivity data, capacity and requirements for the donation center and calculate a number of donors required by the donation center to achieve a target productivity. Additionally, the message generator may generate and send a communication to a plurality of donors within the donor database if there is a difference between an actual number of donors and a target number of donors. The donor database may include a list of plasma donors maintained by a donor management system.

The second communication may provide information to the plasma donor in order to entice the donor to return to the donation center and/or may include gamification motivational techniques to increase the probability of donor engagement. The heuristic information about the donation center's productivity may be determined from the donation center's donor management system. The system may also include a data storage device that stores the donor information and donor data. The communications may be sent via text messaging systems, notification systems, e-mails, ringer, vibrations or other related visual, audible or haptic systems provided by mobile devices.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

In illustrative embodiments, a system and method for engaging a donor sends a number of communications to a donor after completion of a first donation. For example, the system and/or method may send the donor information about the donation that they just completed, information about possible future donations, and referral requests for additional donors. To increase the chance of the donor responding/interacting with the communication one or more of the communication may include game mechanics. Details of illustrative embodiments are discussed below.

Figure 1:
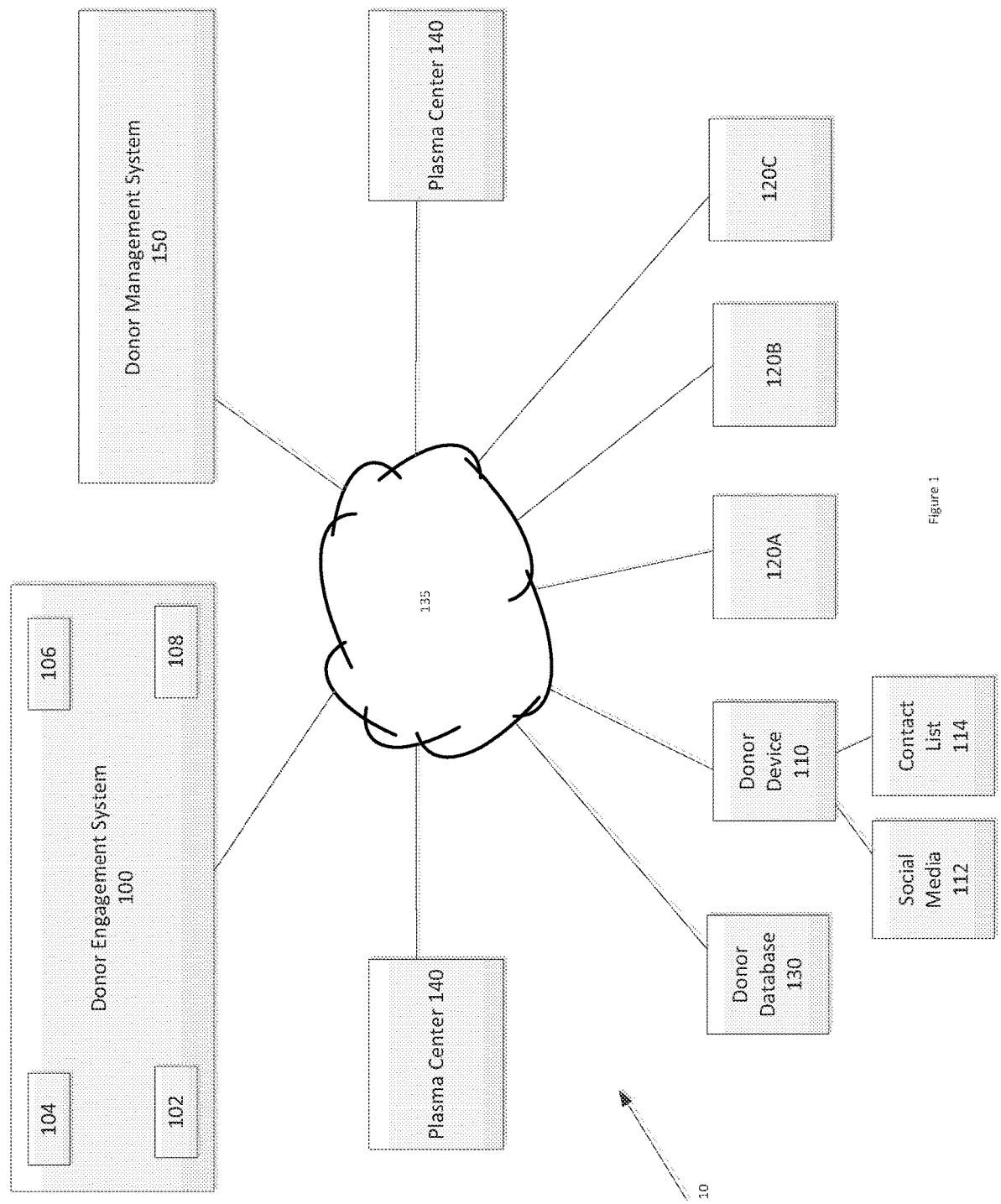
FIG. 1 schematically shows a system for engaging a donor, in accordance with embodiments of the present invention.

FIG. 1 shows a system 10 for engaging a number of donors (e.g., plasma donors) by communicating with each of the donors over a period of time. For example, the system 10 may include a global data communications network 135, such as the internet. The system 10 may also include a server 104 that is in communication with the global communications network 135 and, perhaps, located within a donor engagement system 100. As discussed in greater detail below, the donor engagement system 100 may generate and send various communications to one or more donor devices 110 and/or potential donor devices 120A-C and receive data from a donor database 130, plasma centers 140, and/or the donor management system 150 via the communications network. The donor devices 110 and potential donor devices 120A-C devices may be workstations/computers within the donor's home, the donor's laptop, cellular phone, tablet, or similar web-connected computing device. It should be noted that, although FIG. 1 shows the donor database as a separate component, in some embodiments, the donor database 130 may be part of the donor management system 150.

As noted above and as discussed in greater detail below, the donor engagement system 100 may receive data from various sources, process/analyze the data/information and generate and send communications to donors and potential donors. To that end, the engagement system 100 may have a data storage device 106 that stores the received information/data and a heuristics/artificial intelligence module 102 that analyzes the information/data using various heuristic models. Additionally, the engagement system 100 has a message generator 108 that generates and sends the various messages to the donors and potential donors.

Figure 2:
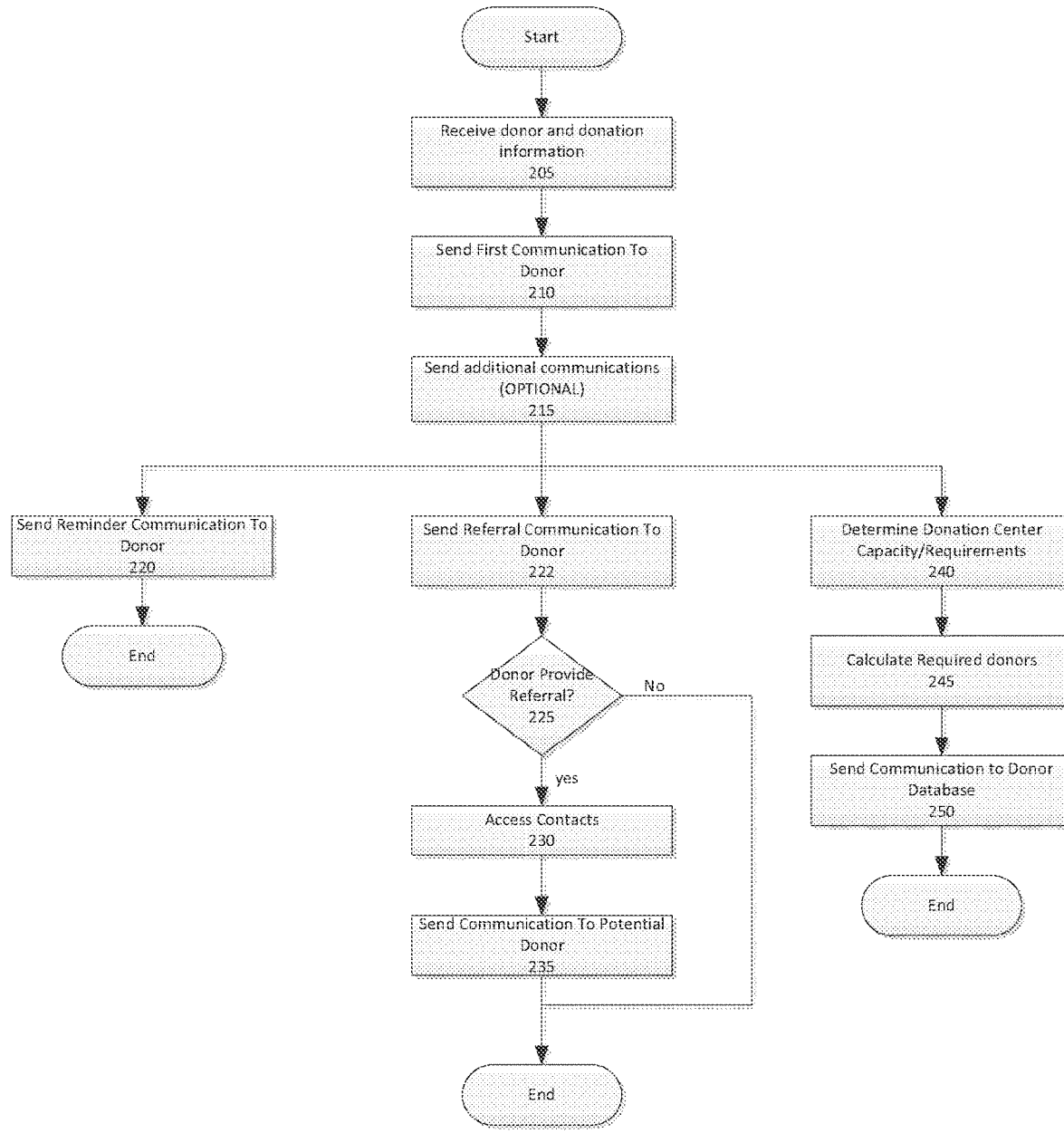
FIG. 2 schematically shows a method for engaging a donor in accordance with embodiments of the present invention

FIG. 2 schematically shows a method 200 (e.g., carried out by the engagement system 100) for engaging a donor, in accordance with some embodiments of present invention. First, the engagement system 100 may receive donor and donation information from the donor database 130 and/or the donor management system 150 (Step 205). For example, the server 104 may access the donor database 130 and/or the donor management system 150 via the network 135 and download the donor information and donation information for each of the donors. Alternatively, the donor database 130 and/or the donor management system 150 may periodically send the donor and donation information to the engagement system 100. Upon receipt of the data/information, the engagement system 100 may save the data/information in the database 106. Based on this data, the system 100 (e.g., the message generator 108) may generate and send a communication to a plasma donor's device 110 (e.g., their cellular or mobile device) upon completion of a plasma donation (step 210) to thank them for visiting and donating at the plasma center 140. The engagement system 100 may also, optionally, send additional communications (Step 215) to the donor's cellular or mobile device 110 upon completion of a plasma donation, for example, to inform them of payments disbursed to them related to the plasma center visit.

Additionally, the system 100/method 200 (e.g., the server 104 or a processor within the engagement system 100) may track the donor data to determine when the donor can return to the donation center (e.g., the plasma center 140) to donate again. The engagement system 100 (e.g., the message generator 108) may then generate an additional message that provides a return date for the next visit. The return date may be predetermined based on the donor's criteria such as donation eligibility and qualification dates. For example, the system 100 may send a communication (Step 220) to a plasma donor's cellular or mobile device 110 upon approach of the plasma donor's return date for the next visit to remind them of their ability to donate plasma and to provide additional information related to their return donation. The engagement system 100 may also use the reminder communication to provide the plasma donor with information about the best day and time of the day to return for a visit based on heuristic information about the plasma center's productivity determined from the plasma center's donor management system 150.

For example, the engagement system 100 (e.g., the server 104) may be in communication with a plasma center 140 (or more than one plasma center) so that it may access and/or download data relating to the plasma center's productivity (e.g., number of donations, busy times, slow times, target collection goals, current collection levels, etc.). The engagement system 100 (e.g., the heuristics module/artificial intelligence module 102) may read the data collected from the plasma center 140 (and, perhaps stored in the data storage device 106) and the heuristic/artificial intelligence module 102 may use heuristics (e.g., a heuristic model) to analyze the data and determine the best day and time for the donor to return. The message generator 108 may then generate a message to be sent to the donor with the recommended day/time to return.

The recommendation for best day or time of day to visit may also be accompanied by an appointment reservation to schedule that time period for the donor to return to the center 140. Alternatively, the communication may include a reservation for the donor and the user may simply have to click "accept" on their device 110 to make/confirm the reservation. Additional information related to the return visit may also be communicated such as total expected compensation, compensation accrual and balance, and potential level achievement and trophies to be acquired.

In some embodiments, the engagement system 100 may utilize the donor list/information to try to attract new donors. For example, the engagement system 100 may generate (e.g., using the message generator 108) and send a communication (Step 222) to the plasma donor device 110 seeking a referral to gain new donors by allowing the donor to share information about their contacts. If the donor provides the referral and allows access to their contact list (Step 225), the system 100 (e.g., the server 104) may access the donor's contacts from the contact list 114 on the cellular or mobile device or from an external database or service, such as social media platforms 112 (Step 230). The engagement system 100 may then use the contact information to initiate communications with these potential donors by generating and sending a personalized message to the contacts' (e.g., the potential donors) cellular devices 120A/B/C or other electronic communication methods or devices (Step 235). The personalized message may include the name of the referring donor, the location of the plasma donation center, preferred date and time to donate, educational information about plasma donation, benefits and rewards of plasma donation, and/or links to other such resources related to plasma donations. The information accessed from the donor's contacts (e.g., the information regarding potential donors) may be stored within the data storage device 106 once it is accessed or it may be stored only after the potential donor agrees to donate.

In some embodiments, the system 100 may elevate the plasma donor's relationship and experience with the plasma center by using gamification motivational techniques. The system may employ elements of game mechanics into the plasma donor communication which include rewards such as cash or points, redemption of rewards, communication of achievement levels, issuing challenges, awarding badges or trophies, tracking of achievement progress, and comparing progress against a leaderboard of other plasma donors.

In addition to engaging donors to entice them to donate again, some embodiments, may also help donation/plasma centers 140 meet their targets by determining plasma center capacity and requirements (Step 240) for plasma donors. As noted above, the system 100/method 200 may be in communication with one or more plasma centers 140 and may access and/or download productivity, target, and other information regarding each of the plasma centers 140. The engagement system 100 (e.g., the server 104 and/or AI/heuristics module 102) may use this information to track and monitor the plasma center's requirements and calculate the number of donors (Step 245) required by the plasma center to achieve target productivity. Any difference between the actual plasma donors compared to the target plasma donors (or a difference in another metric such as target collections) will cause the engagement system 100 to generate and send a timely and personalized communication to the database 130 of candidate plasma donors maintained (e.g., and stored within the data storage device/database 106) by the system 100 or the donor management system 150 (Step 250). In some instances, the engagement system 100/method 200 may send the communication to all of the donors within the database 106/130. However, in other embodiments, the engagement system 100 may utilize the artificial intelligence/heuristic module 102 to determine an optimum number of communications to send based on how much the plasma center 140 is behind target and an expected rate of donor participation in response to the communications. For example, if the plasma center 140 is 100 donors behind target and the system 100 expects a 50% donor response, the system 100/method 200 may send the communications to 200 donors in order to get 100 donors to donate.

The above communication(s) will provide information to the plasma donor with the goal of enticing the donor to return for a visit at the plasma center. For example, the system 100/method may provide bonuses to the donor (e.g., additional game points, awards, achievements, or additional compensation) based on the capacity and current productivity of the plasma center 140. For example, if the plasma center 140 is currently behind its collection target, the system 100/method 200 may incentivize the donor to return by increasing the amount of compensation they will get for the donation. The information provided may use gamification motivational techniques to increase the probability of donor engagement.

It should be noted that the engagement system 100 may communicate with the plasma donor(s) through a multitude of channels available on the donor's cellular or mobile device. Additional channels may include text messaging systems, notification systems, e-mails, ringer, vibrations and other related visual, audible or haptic systems provided by mobile devices.

Prior to the plasma donor arriving at the plasma center, the engagement system 100 may also facilitate the pre-processing of the donor by prompting and gathering donor data related to the upcoming donor event. For example, the engagement system 100 and/or the donor management system 150 may maintain all the relevant information required for the donor to check in at the plasma center 140 (e.g., name, age weight, BMI, donor ID, etc.). Upon acknowledgement of the donor that they will be donating in response to the communications (e.g., if they accept the appointment mentioned above), the engagement system 100/method 200 may transmit (or instruct the donor management system 150 to transmit) the donor data to an external system (e.g., a kiosk or similar system/device) at the plasma center 140 for pre-processing (e.g., prior to the donor's arrival). This, in turn, expedites the donor intake process and reduces the plasma donor's visit duration at the plasma center 140.

It should be noted that although the above is described with respect to plasma donation, various embodiments of the present invention can apply to other donations—for blood, blood components or other types of donations. Additionally further embodiments may be used to engage individuals other than donors, for example, patients, customers, participants, etc.

It is also important to note that terms such as "controller," "processor" and "server" may be used herein to describe devices that may be used in certain embodiments of the present invention and should not be construed to limit the present invention to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies The various components of the control program may be implemented individually or in combination. For example, each component may be implemented or a dedicated server or a set of servers configured in a distributed manner It should also be noted that devices may use communication protocols and messages (e.g., messages created, transmitted, received, stored, and/or processed by the system), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, interfaces, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other programmable logic device (PLD)), discrete components, integrated circuitry (e.g., an Application Specific Integrated Circuit (ASIC)), or any other means including any combination thereof. In some embodiments of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). In fact, some embodiments, may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computing device-implemented method for enhancing plasma acquisition, the computing device including at least one processor, the method comprising:

receiving, in a server, donor information and donation data for a donor;

sending a first communication to the donor, the first communication being sent to the donor after completion of a donation;

monitoring a time period after the donation to determine when a predetermined period of time has passed;

receiving, in a server, productivity information for a plasma donation center;

determining capacity and requirements for the plasma donation center and a number of donors required by the plasma donation center to achieve a target productivity for the plasma donation center with a heuristics module or artificial intelligence module executed by a processor and using the productivity information;

generating, based on the determining, a second communication to the donor after the passage of the predetermined time period, the second communication reminding the donor that the donor is eligible to donate again and including a preferred date and time for the donor to return to donate again, the preferred date and time based, at least in part, on heuristic information about the plasma donation center's productivity; and sending the second communication to the donor's mobile device, the second communication configured to trigger a visual, haptic or auditory effect on the donor's mobile device.

2. The method of claim 1, wherein the first communication includes information regarding a payment to the donor and/or a possible return date and time for a second donation.

3. The method of claim 1, wherein the second communication includes at least one selected from the group consisting of an appointment reservation for a second donation, information regarding expected compensation, information regarding compensation accrual and balance, and information regarding potential level achievement and trophies to be acquired.

4. The method of claim 1, further comprising:
sending a third communication to the donor, the third communication requesting a referral of at least one additional donor from the donor.

5. The method of claim 4, further comprising:
receiving a referral from the donor in response to the third communication, the referral granting access to the donor's contact list on their cellular or mobile device or from an external database.

6. The method of claim 5, wherein the external database is a social media platform.

7. The method of claim 5, further comprising:
generating a referral communication to at least one potential donor from the contact list, the referral communication including a personalized message; and
sending the referral communication to the at least one potential donor from the contact list.

8. The method of claim 7, wherein the personalized message includes at least one selected from the group consisting of: the name of the referring donor, the location of the plasma donation center, preferred date and time to donate, educational information about plasma donation, benefits and rewards of plasma donation, and/or links to other such resources related to plasma donations.

9. The method of claim 7, wherein at least one of the first, second and/or referral communications includes game mechanics.

10. The method of claim 9, wherein the game mechanics includes at least one selected from the group consisting of reward cash, reward points, redemption of rewards, communication of achievement levels, issuing challenges, awarding badges or trophies, tracking of achievement progress, and comparing progress against a leaderboard of other plasma donors.

11. The method of claim 1, further comprising:
receiving plasma donation center data from a plasma donation center, the plasma donation center data including the productivity data for the donation center;
determining, based on the plasma donation center data, capacity, timing, throughput, and requirements for the plasma donation center;
generating, if there is a difference between an actual number of donors and the target number of donors determined by the heuristics module or the artificial intelligence module, an additional communication to a plurality of donors within a donor database; and
sending the communication to the plurality of donors within the donor database.

12. The method of claim 11, wherein the donor database includes a list of plasma donors maintained by a donor management system.

13. The method of claim 11, wherein the communication provides information to the plasma donor in order to entice the donor to return to the plasma donation center.

14. The method of claim 13, wherein the communication includes gamification motivational techniques to increase the probability of donor engagement.

15. The method of claim 1, wherein the heuristic information about the plasma donation center's productivity is determined from the plasma donation center's donor management system.

16. The method of claim 1, further comprising:
storing, in a data storage device, the donor information and donor data.

17. A system for enhancing plasma acquisition, comprising:
a server configured to receive donor information and donation data for the donor from a donor database, the server further configured to receive productivity data from a plasma donation center;
a processor configured to monitor, based on the donor information and donation data, a time period after a donation to determine when a predetermined period of time has passed;
a heuristic module or artificial intelligence module executed by the processor and configured to analyze the productivity data from the plasma donation center and determine capacity and requirements for the plasma donation center and a number of donors required by the plasma donation center to achieve a target productivity for the plasma donation center and a preferred date and time for the donor to return to the plasma donation center for an additional donation, the preferred date and time selected to help achieve the target productivity for the plasma donation center; and
a message generator configured to generate and send a first communication to the donor after the donor has completed a donation and to generate a second communication to the donor's mobile device after the passage of the predetermined time period and the determining of the heuristic or artificial intelligence module of the number of donors required to achieve the target productivity, the second communication reminding the donor that the donor is eligible to donate again and including the preferred date and time for the donor to return, the second communication configured to trigger a visual, haptic or auditory effect on the donor's mobile device.

18. The system of claim 17, wherein the first communication includes information regarding a payment to the donor and/or a possible return date for a second donation.

19. The system of claim 17, wherein the second communication further includes at least one selected from the group consisting of an appointment reservation for a second donation, information regarding expected compensation, information regarding compensation accrual and balance, and information regarding potential level achievement and trophies to be acquired.

20. The system of claim 17, wherein the message generator is further configured to generate and send a third communication to the donor, the third communication requesting a referral of at least one additional donor from the donor.

21. The system of claim 20, wherein the server is further configured to receive a referral from the donor in response to the third communication, the referral granting access to the donor's contact list on their cellular or mobile device or from an external database.

22. The system of claim 21, wherein the external database is a social media platform.

23. The system of claim 21, wherein the message generator is further configured to generate and send a referral communication to at least one potential donor from the contact list, the referral communication including a personalized message.

24. The system of claim 23, wherein the personalized message includes at least one selected from the group consisting of: the name of the referring donor, the location of the plasma donation center, preferred date and time to donate, educational information about plasma donation, benefits and rewards of plasma donation, and links to other such resources related to plasma donations.

25. The system of claim 23, wherein at least one of the first, second and/or referral communications includes game mechanics.

26. The system of claim 25, wherein the game mechanics includes at least one selected from the group consisting of reward cash, reward points, redemption of rewards, communication of achievement levels, issuing challenges, awarding badges or trophies, tracking of achievement progress, and comparing progress against a leaderboard of other plasma donors.

27. The system of claim 17, wherein the heuristic module or artificial intelligence module determines, based on the plasma donation center productivity data, capacity, timing, throughput and requirements for the plasma donation center.

28. The system of claim 27, wherein the message generator is configured to generate and send a communication to a plurality of donors within the donor database if there is a difference between an actual number of donors and a target number of donors.

29. The system of claim 27, wherein the donor database includes a list of plasma donors maintained by a donor management system.

30. The system of claim 17, wherein the second communication provides information to the plasma donor in order to entice the donor to return to the plasma donation center.

31. The system of claim 30, wherein the second communication includes gamification motivational techniques to increase the probability of donor engagement.

32. The system of claim 17, wherein the heuristic information about the plasma donation center's productivity is determined from the plasma donation center's donor management system.

33. The system of claim 17, further comprising:
a data storage device configured to store the donor information and donor data.

* * * * *